United States Patent [19]
Gordon

[11] Patent Number: 5,999,105
[45] Date of Patent: Dec. 7, 1999

[54] MULTIPLE SENSORY MESSAGE CENTER APPARATUS

[76] Inventor: Gary M. Gordon, 4114 E. 141st St., Cleveland, Ohio 44128

[21] Appl. No.: 09/070,298

[22] Filed: Apr. 30, 1998

[51] Int. Cl.⁶ ..................................................... G06F 15/16
[52] U.S. Cl. ................ 340/825.35; 235/383; 235/472.01
[58] Field of Search ........................ 340/825.35; 235/383

[56] References Cited

U.S. PATENT DOCUMENTS

| | | |
|---|---|---|
| D. 344,505 | 2/1994 | Traldi . |
| D. 355,676 | 2/1995 | Wilson . |
| 5,111,196 | 5/1992 | Hunt . |
| 5,237,157 | 8/1993 | Kaplan . |
| 5,434,631 | 7/1995 | Lieberman et al. . |
| 5,465,085 | 11/1995 | Caldwell et al. . |
| 5,504,475 | 4/1996 | Huudoj ................................ 340/825.35 |

*Primary Examiner*—Harold I. Pitts
*Attorney, Agent, or Firm*—John D. Gugliotta

[57] ABSTRACT

A multiple sensory message center apparatus is disclosed which allows for the transmission of a message using the maximum number of transmission paths afforded by the humans senses as possible. The disclosure comprises an electronic display screen capable of displaying video images, sound generation electronics and equipment for the production of odors to stimulate the human olfactory senses as well. The apparatus is capable of display video images from pre-stored computer-based images, hand drawn images from an optical light pen, and video images from a security surveillance camera. The apparatus is capable of playback of audio messages from a tape unit, pre-stored computer based sound files, and an internal electronic-based message machine. Additionally, the apparatus is capable of the distribution of odors from pre-stored wax-based cartridges to assist in the conveyance of a message.

8 Claims, 4 Drawing Sheets

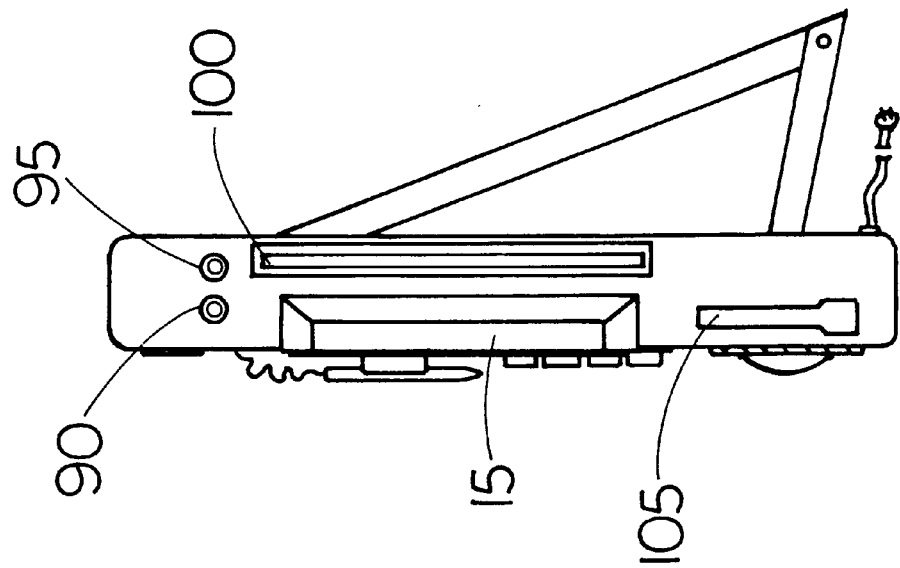
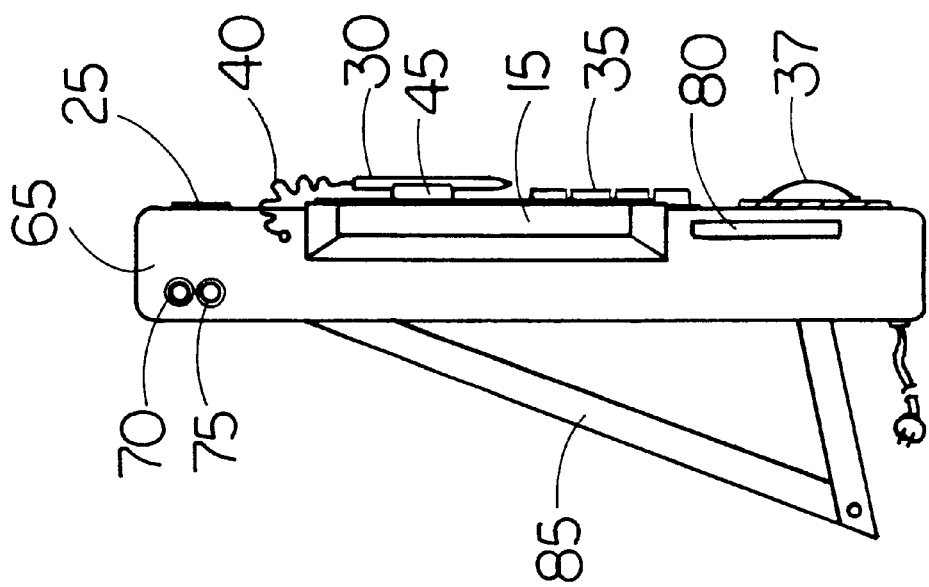

MULTIPLE SENSORY MESSAGE CENTER APPARATUS

BACKGROUND OF THE INVENTION

1. Field of the Invention

The present invention relates generally to apparatuses that provide for the displaying and conveying of messages and, more particularly, to an apparatus that provides for the displaying and conveying of messages using audio, visual and olfactory human senses as the transmission medium.

2. Description of the Related Art

The problems associated with the displaying and conveying of messages whether for personal or commercial use are well known and have been addressed somewhat by the prior art. For example, in U.S. Pat. No. Des. 344,505 issued in the name of Traldi, a multimedia display is disclosed. An invention made according to the Traldi reference would provide for the displaying of visual messages in an attention gathering manner. However, a device as envisioned by Traldi presents several problems. Perhaps the most significant problem is that the device only provides for visual messages and does not engage the maximum number of human senses. It can be envisioned therefore that many messages displayed by the Traldi invention do not get noticed by the intended recipient. Thus, the main objective of the invention is unaccomplished.

Consequently, a need has been felt for providing an apparatus for the displaying and conveying of messages using the maximum number of transmission paths allowed by human sensory input means as possible.

SUMMARY OF THE INVENTION

It is therefore an object of the present invention to provide an improved multiple sensory message center apparatus.

It is another object of the present invention to provide an improved multiple sensory message center apparatus that provides for the displaying and subsequent transmission to the intended recipient using the maximum number of paths afforded by the human senses.

It is yet another object of the present invention to provide an improved multiple sensory message center apparatus that is easily operable by a user with little or no training.

It is another object of the present invention to provide an improved multiple sensory message center apparatus that provides for the transmission of a message to those recipients suffering from a physical disability that does not allow the use of one or more human senses.

It is yet another object of the present invention to provide an improved multiple sensory message center apparatus that permits the instantaneous revision of any displayed visual message using a variety of mediums.

It is another object of the present invention to provide an improved multiple sensory message center apparatus that permits the playback of audio messages from a variety of input sources.

It is yet another object of the present invention to provide an improved multiple sensory message center apparatus that permits the dispensing of various odors to assist in the conveyance of a message.

It is another object of the present invention to provide an improved multiple sensory message center apparatus that permits the auxiliary display of visual information such as time, temperature, or security surveillance information.

It is a feature of the present invention to provide an improved multiple sensory message center apparatus that is allows for inputting of messages by a variety of mediums such as a computer keyboard, CD-ROMS, PC Cards, or optical light pens.

It is another feature of the present invention to provide an improved multiple sensory message center apparatus that is allows for the use of an optical light pen or a control pad for the selection of options from a menu.

Briefly described according to one embodiment of the present invention, a multiple sensory message center apparatus is disclosed which allows for the transmission of a message using the maximum number of transmission paths afforded by the humans senses as possible. The present invention comprises an electronic display screen capable of displaying video images, sound generation electronics and equipment for the production of odors to stimulate the human olfactory senses as well. The apparatus is capable of display video images from pre-stored computer-based images, hand drawn images from an optical light pen, and video images from a security surveillance camera. The apparatus is capable of the playback of audio messages from a tape unit, pre-stored computer based sound files, and an internal electronic-based message machine. Finally, the apparatus is capable of the distribution of odors from pre-stored wax-based cartridges to assist in the conveyance of a message.

An advantage of the present invention is that it may be used for keeping family members appraised of personal itineraries and/or responsibilities.

Another advantage of the present invention is that it may be used for educational purposes to allow for lesson plans to have the maximum impact due to the additional use of the human sense of smell in lieu of only sight and sound.

Yet another advantage of the present invention is that it may be used for commercial purposes to allow for special purpose advertising that attracts the attention of the possible consumer using the sense of smell.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is an end view taken along a line I—I as shown in FIG. 1;

FIG. 3 is an end view taken along a line II—II as shown in FIG. 1;

DESCRIPTION OF THE PREFERRED EMBODIMENTS

1. Detailed Description of the Figures

Figure 1:
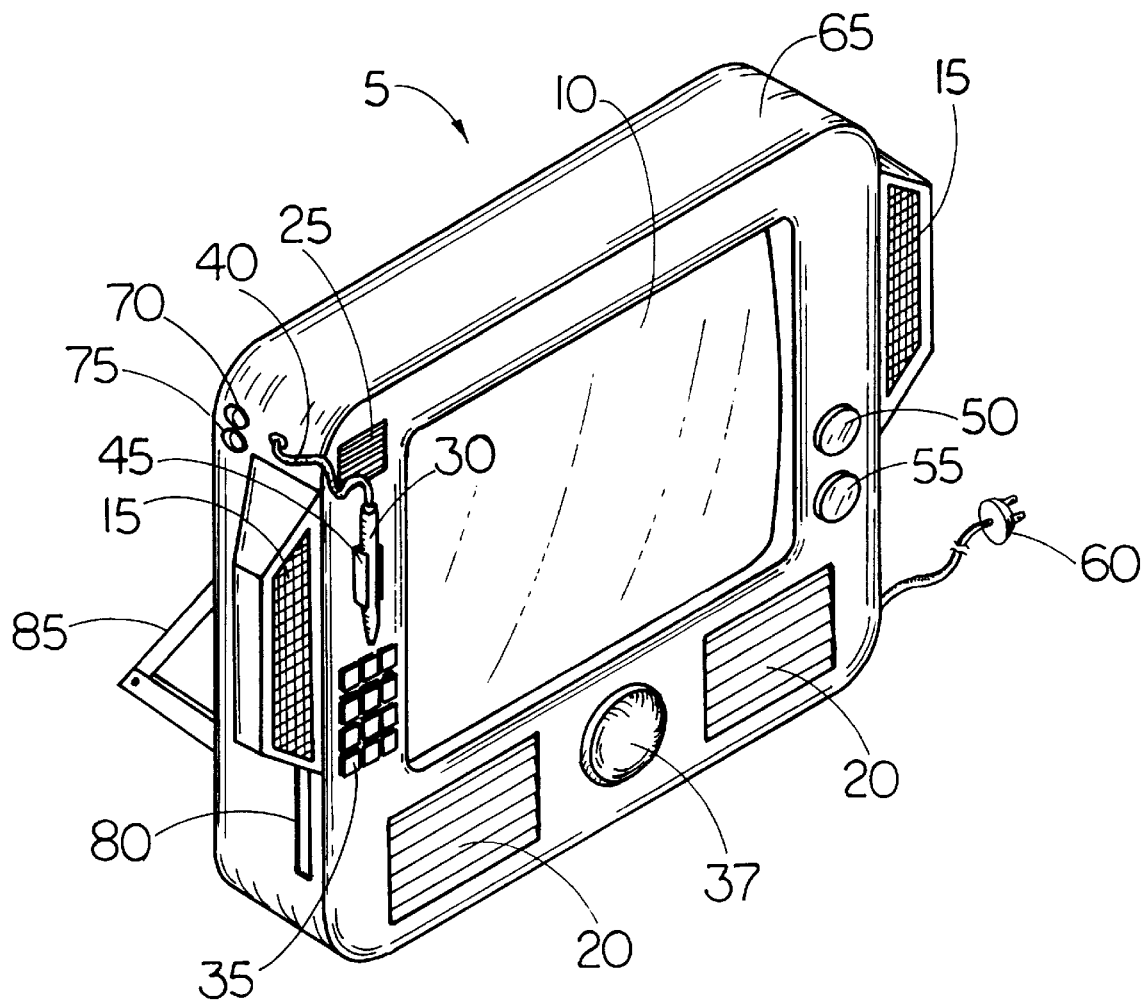
FIG. 1 is a front perspective view of the present invention shown in accordance with a preferred embodiment of the present invention.

Referring now to FIG. 1, a front perspective view of a multiple sensory message center apparatus 5 is disclosed. Located in the direct middle portion of the multiple sensory message center apparatus 5 is a visual electronic display screen 10. It is currently envisioned that the visual electronic display screen 10 is of a low-profile, color, active matrix LCD design such as would be found on a laptop computer, though rapid technological advances may allow for different technologies in the near future. Located on the two exterior vertical edges of the visual electronic display screen 10 is a pair of audio speakers 15. Located along the extreme bottom edge of the multiple sensory message center apparatus 5 is a pair of odor producing means 20. The function and operating parameters of the pair of odor producing means 20 will be described in greater detail below. Located along the left-hand side of the multiple sensory message center apparatus 5 from top to bottom are a microphone 25, an optical light pen 30 and a control pad 35 respectively. Although a keyboard type data entry device is common and envisioned for use with the control pad 35, other conventional data entry devices can be included, such as a track ball type controller 37. The optical light pen 30 is electrically connected to the multiple sensory message center apparatus 5 via an optical light pen cable 40, and held in physical place by an optical light pen holder 45 when not in use. The brightness and contrast of the visual electronic display screen 10 are controlled by a brightness control 50 and a contrast control 55 respectively located on the front of the multiple sensory message center apparatus 5. Providing electrical power for the multiple sensory message center apparatus 5 is an alternating current power cord 60. An enclosure 65 provides the means for containment and physical attachment of all exterior items as listed as well as interior equipment which will be described in greater detail below. It is envisioned that the enclosure 65 will be constructed of injection molded plastic to allow the multiple sensory message center apparatus 5 to be placed on a horizontal surface or be hung from a wall.

Referring next to FIG. 2, an end view of the multiple sensory message center apparatus 5 as seen along a line I—I as shown in FIG. 1. is disclosed. In this view one of the pair of audio speakers 15 is seen along with the optical light pen 30, the optical light pen cable 40 and the optical light pen holder 45. Also seen in this view is a first analog input jack 70 and a second analog input jack 75 for the purposes of providing digital readout of user supplied analog inputs such as temperature, wind speed, barometric pressure, or dry contact switch closures as would be provided by a motion sensor system such to turn off the visual electronic display screen 10 and place the multiple sensory message center apparatus 5 into a standby mode when no observers are present. Located on the lower portion of the enclosure 65 is a digital electronic storage means 80. It is currently envisioned that the digital electronic storage means 80 is a PC Card as would be found in conventional laptop computers, though it can easily be seen by those familiar in the art that rapid advances in technology would allow for other storage means as well. The advantage of a removable storage device is that pictorial video images can be obtained from a wide variety of sources including analog video images, photograph scanning, the Internet or a wide variety of software graphic programs. Finally, also seen in this view is a display stand 85 for the purposes of displaying the multiple sensory message center apparatus 5 on a horizontal surface such as a desk or counter top. The display stand 85 also folds flat and provides for the hanging of the multiple sensory message center apparatus 5 on a vertical surface such as a wall.

Referring now to FIG. 3, an end view of the multiple sensory message center apparatus 5 as seen along a line II—II as shown in FIG. 1. is disclosed. In this view one of the pair of audio speakers 15 is seen along with the exterior edge of the enclosure 65. Also, present is a video input jack 90 and an audio input jack 95. While the video input jack 90 and the audio input jack 95 are for the purposes of user supplied video and audio signals, they provide for the playback of audio/video sources from a wide number of sources. Present technology envisions these sources to be a playback screen from a security camera surveillance system, a video camcorder, a baby monitoring system, or a door answering system. It can be easily seen by those familiar in the art that rapid advances in technology will allow for additional uses in the near future. Located directly below the audio input jack 95 is an optical disk playback unit 100. It is envisioned that the optical disk playback unit 100 will be a CD-ROM playback unit, though emerging technologies such as DVD discs would serve the same purpose. The optical disk playback unit 100 will also serve to provide digital video pictures and software operating code in the same manner as the digital electronic storage means 80 (not shown in this FIG.) as discussed earlier. Additional functions of the optical disk playback unit 100 is to provide audio messages and/or music for playback through the pair of audio speakers 15. Located below and to the left of the optical disk playback unit 100 is a magnetic tape playback unit 105. It is currently envisioned that the magnetic tape playback unit 105 be of a cassette playback unit design and provide additional audio messages and/or music playback through the pair of audio speakers 15 is the same manner as the optical disk playback unit 100.

Figure 4:
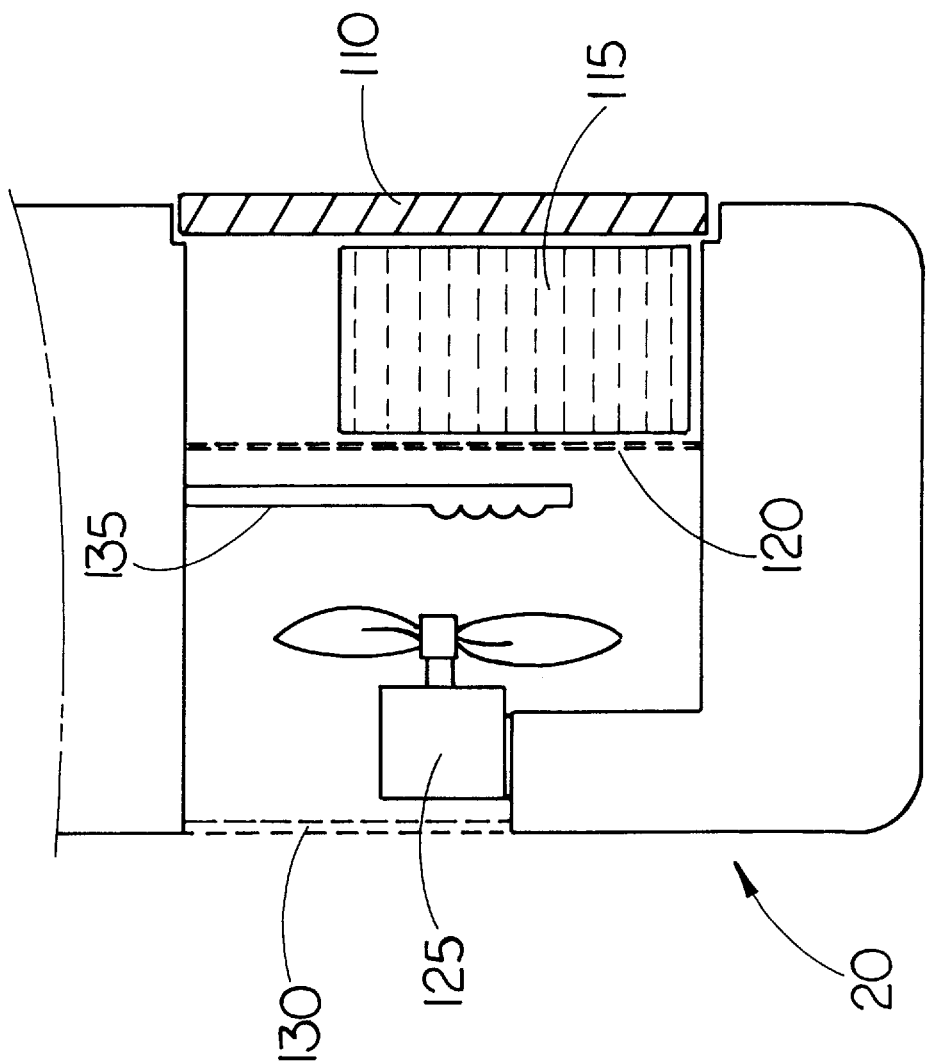
FIG. 4 is a cross sectional view taken along a line III—III as shown in FIG. 1.

Referring now to FIG. 4, a cross sectional view taken along a line III—III as shown in FIG. 1 is disclosed. FIG. 4 discloses the pair of odor producing means 20 in greater detail. A snap in grill 110 allows for the user installation of a wax encapsulated odor storage means 115. The wax encapsulated odor storage means 115 is held in place by mechanical friction between the snap in grill 110 and a storage screen 120. Located in the rear of the cavity formed by the enclosure 65 is a two-speed electric fan 125 which draws in ambient room air from a rear air openings 130 and disperses it through the storage screen 120, over the wax encapsulated odor storage means 115, and out to the ambient air via the snap in grill 110. A low wattage electric heating coil 135 is installed to provide a small amount of heat to aid in the dissolving of the wax encapsulated odor storage means 115 and its subsequent release of odor. The operation of the two-speed electric fan 125, its speed setting and the operation of the low wattage electric heating coil 135 is all controlled via the control pad 35 (as shown in FIG. 1) by the user. While the pair of odor producing means 20 allows for room deodorizer functions, it is currently envisioned that additional applications are numerous. The pair of odor producing means 20 could be used to alert users with both a visual and audio disability to the presence of a physical danger by the use of a slightly foul or pungent odor. Additional uses can be found in advertising, such as the releasing of specific food odors such as popcorn, fresh bread, or other foods.

Figure 5:
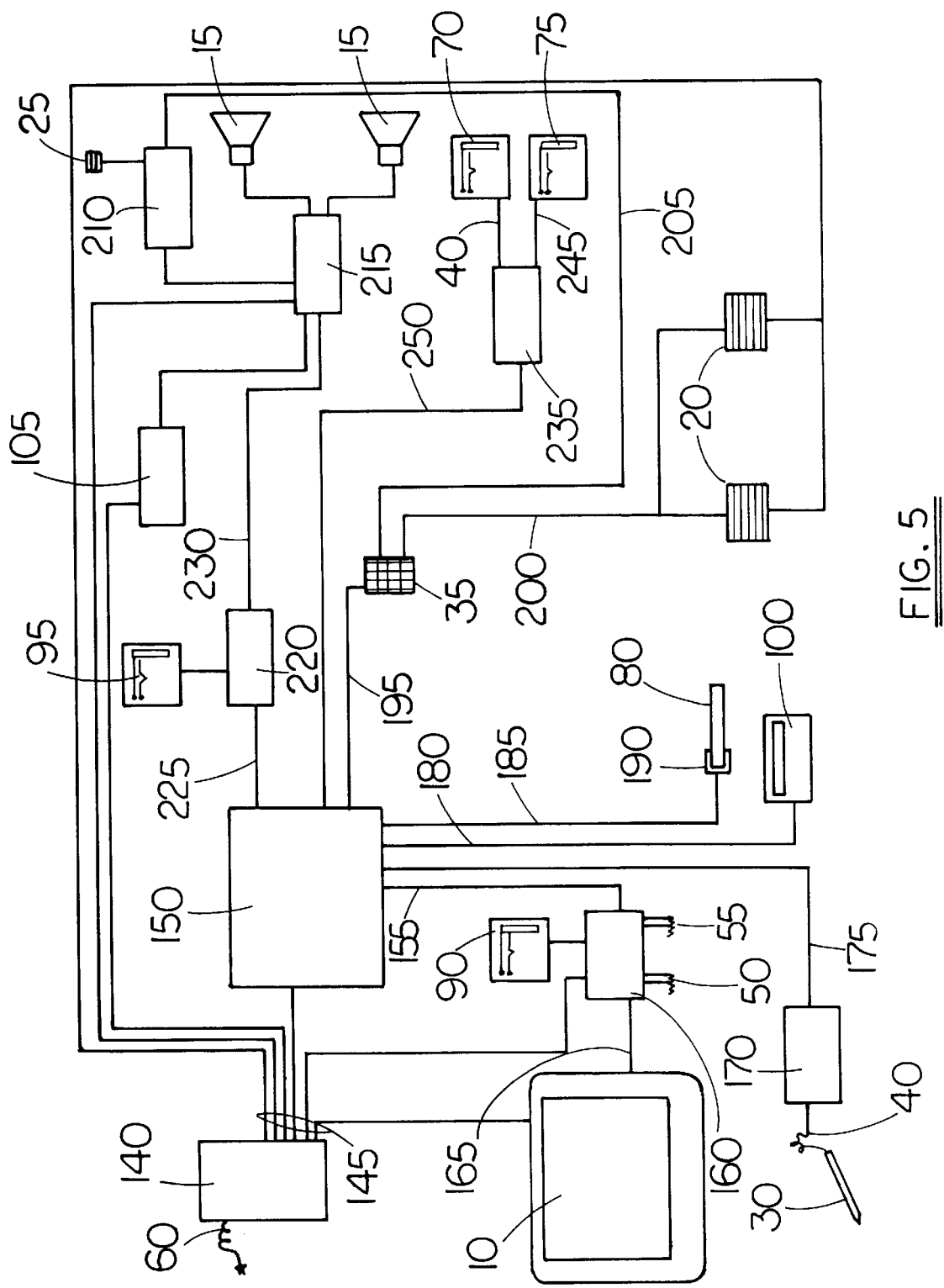
FIG. 5 is an electrical block diagram of the present invention.

Referring finally to FIG. 5, an electrical block diagram of the present invention is disclosed. The alternating current power cord 60 provides electrical power to a power supply 140. The power supply 140 is of a conventional multi-voltage design with integral voltage reduction and regulation features as would be found in a conventional laptop computer, though it can be easily seen by those familiar in the art that other power supply designs including battery powered devices would work equally well. A power wiring harness 145 provides a path to distribute the various voltages to individual components as shown. A central processing unit 150 handles many of the control functions of the multiple sensory message center apparatus 5. The central processing unit 150 is of a conventional microprocessor design found in conventional laptops. Internal operating codes with specialized batch files stored in onboard memory on the central processing unit 150 provide the necessary structure to operate the multiple sensory message center apparatus 5 as described. A first digital signal path 155 carries image and data signals to a display driving circuits 160, which also accepts video signals from the video input jack 90 and control signals from the brightness control 50 and the contrast control 55. The processed video signal is then sent to the visual electronic display screen 10 via a video signal path 165. Images displayed on the visual electronic display screen 10 are intercepted by the optical light pen 30, the optical light pen cable 40 and an input driver circuit 170. The resultant signal is carried by a second digital signal path 175 back to the central processing unit 150 where it is synchronized with the first digital signal path 155 to develop a relative position on the visual electronic display screen 10. This relative position is then used in the development of on-screen screen sketches on the visual electronic display screen 10, much like a digital blackboard, menu selections obtained internally from the central processing unit 150, and overlay handwritten text used in conjunction with other images on the visual electronic display screen 10. A third digital signal path 180 carries digital signals from the optical disk playback unit 100 directly to the central processing unit 150. As previously disclosed, the digital signals present on the third digital signal path 180 include graphic images for display on the visual electronic display screen 10 as well as program source code and operating system updates for the central processing unit 150. A fourth digital signal path 185 provides a signal path between the central processing unit 150 and the digital electronic storage means 80 via a digital electronic storage means input jack 190. The signals carried into the central processing unit 150 on the fourth digital signal path 185 are basically the same as the third digital signal path 180 with the major exception the fourth digital signal path 185 is a bi directional path that allows the storage of data on the digital electronic storage means 80. A fifth digital signal path 195 provides user input control between the central processing unit 150 and the control pad 35. This control is in addition the user input as supplied via the second digital signal path 175 as described earlier. Additional discrete control from the control pad 35 is provided to the two-speed electric fan 125 (As shown in FIG. 4) and the low wattage electric heating coil 135 (As shown in FIG. 4) comprising the pair of odor producing means 20 via a first discrete control signal path 200. Functions controlled via the first discrete control signal path 200 are fan operation, fan speed and heating coil operation. A second discrete control signal path 205 also provides discrete control of a voice playback circuitry 210. The voice playback circuitry 210 is equipped with on board analog to digital converters, memory storage, and analog to digital converters to allow the user to record a memo via the microphone 25 and allow for continuous repeated playback or a onetime playback. The first discrete control signal path 200 and the second discrete control signal path 205 which are separated from the fifth digital signal path 195 of the control pad 35 allow for use of the voice playback circuitry 210 and the pair of odor producing means 20 even when the central processing unit 150 is deactivated. Playback of the audio from the voice playback circuitry 210, the magnetic tape playback unit 105, or the central processing unit 150 occur through the pair of audio speakers 15 through an amplifier 215. A digital audio converter/translator 220 converts a sixth digital signal path 225 into an audio signal path 230 for the amplifier 215 to use. In addition, the digital audio converter/translator 220 serves as an input point for the audio input jack 95. Finally the first analog input jack 70 and the second analog input jack 75 are connected to an analog to digital converter 235 via a first analog signal path 240 and a second analog signal path 245 respectively. The digital output from the first analog signal path 240 is then routed back to the central processing unit 150 via a seventh digital signal path 250 where it is used for sensing and control purposes as earlier described.

2. Operation of the Preferred Embodiment

In operation, the present invention can be installed and utilized by the common user in a simple and effortless manner. To use the present invention with its preferred embodiment can best be described in conjunction with the front perspective view of the present invention as shown in FIG. 1, the end view as shown in FIG. 2, the end view as shown in FIG. 3, and the electrical block diagram as shown in FIG. 5.

An individual would begin by first activating the multiple sensory message center apparatus 5 via the control pad 35. The internal operating code of the central processing unit 150 would then cause a startup menu to be displayed on the visual electronic display screen 10. The user could then access the various functions by utilizing the optical light pen 30 or the control pad 35. The functions include the displaying of a picture as stored by the digital electronic storage means 80 or the optical disk playback unit 100, the playback of audio from the optical disk playback unit 100, the magnetic tape playback unit 105 or the voice playback circuitry 210, the recording of an audio message on the voice playback circuitry 210, the writing of a visual message on the visual electronic display screen 10 by using the optical light pen 30, the dissemination of odors from the pair of odor producing means 20, accessing external audio and visual circuits via the audio input jack 95 and the video input jack 90, or accessing external analog control circuits via the first analog input jack 70 and/or the second analog input jack 75. It is envisioned that the present invention would be used in a personal-based home atmosphere for leaving messages to other family members, accessing external audio visual circuits as would be found with a baby monitoring system, a door security system, or an intercom system, and providing for the dissemination of pleasant odors for room deodorizing purposes. The present invention could also be utilized in educational institutions for learning purposes. Finally, the present invention would also be used in a commercial atmosphere for advertising and sale purposes, and in a business atmosphere for communication and information access purposes.

The foregoing description is included to illustrate the operation of the preferred embodiment and is not meant to limit the scope of the invention. The scope of the invention is to be limited only by the following claims.

What is claimed is:

1. A multiple sensory message center apparatus comprising:

visual electronic display screen located in the direct middle portion of the multiple sensory message center apparatus;

a pair of audio speakers located on the two exterior vertical edges of said visual electronic display screen;

odor producing means located along the extreme bottom edge of the multiple sensory message center apparatus;

a microphone;

an optical light pen electrically connected to the multiple sensory message center apparatus via an optical light pen cable and held in physical place by an optical light pen holder when not in use;

a control pad.

2. The multiple sensory message center apparatus of claim 1, wherein said visual electronic display screen comprises a low-profile, color, active matrix LCD design.

3. The multiple sensory message center apparatus of claim 1, further comprising:

at least one analog input jack for the purposes of providing digital readout of user supplied analog inputs such as temperature, wind speed, barometric pressure, or dry contact switch closures as would be provided by a motion sensor system such to turn off the visual electronic display screen and place the multiple sensory message center apparatus into a standby mode when no observers are present.

4. The multiple sensory message center apparatus of claim 1, further comprising:

a digital electronic storage means for providing pictorial video images obtained from a wide variety of sources including analog video images, photograph scanning, the Internet or a wide variety of software graphic programs.

5. The multiple sensory message center apparatus of claim 1, further comprising:

a display stand for the purposes of displaying the multiple sensory message center apparatus on a horizontal surface such as a desk or counter top, wherein said display stand folds flat and provides for the hanging of the multiple sensory message center apparatus on a vertical surface such as a wall.

6. The multiple sensory message center apparatus of claim 1, wherein said odor producing means comprises:

a storage screen;

a snap in grill for allowing for the user installation of a wax encapsulated odor storage means;

a wax encapsulated odor storage means held in place by mechanical friction between the snap in grill; and a low wattage electric heating coil to provide a small amount of heat to aid in the dissolving of the wax encapsulated odor storage means and its subsequent release of odor.

7. The multiple sensory message center apparatus of claim 6, wherein said odor producing means further comprises:

a two-speed electric fan which draws in ambient room air from a rear air openings and disperses it through the storage screen, over the wax encapsulated odor storage means, and out to the ambient air via the snap in grill.

8. The multiple sensory message center apparatus of claim 7, wherein the operation of the two-speed electric fan, its speed setting and the operation of the low wattage electric heating coil is controlled via the control pad.

* * * * *